United States Patent
Doi

(10) Patent No.: US 11,215,214 B2
(45) Date of Patent: Jan. 4, 2022

(54) FASTENERS, FASTENER ASSEMBLIES AND COMPONENTS THEREOF

(71) Applicant: The MONADNOCK Company, Torrance, CA (US)

(72) Inventor: Nicolas Doi, Redondo Beach, CA (US)

(73) Assignee: THE MONADNOCK COMPANY, Torrance, CA (US)

(*) Notice: Subject to any disclaimer, the term of this patent is extended or adjusted under 35 U.S.C. 154(b) by 138 days.

(21) Appl. No.: 16/387,510

(22) Filed: Apr. 17, 2019

(65) Prior Publication Data
US 2020/0332820 A1  Oct. 22, 2020

(51) Int. Cl.
| F16B 35/00 | (2006.01) |
| F16B 21/08 | (2006.01) |
| F16B 5/02 | (2006.01) |
| F16B 19/02 | (2006.01) |
| F16B 21/07 | (2006.01) |
| F16B 21/18 | (2006.01) |
| F16B 15/02 | (2006.01) |
| F16B 15/06 | (2006.01) |

(52) U.S. Cl.
CPC .......... F16B 21/086 (2013.01); F16B 5/0258 (2013.01); F16B 19/02 (2013.01); F16B 21/073 (2013.01); F16B 21/186 (2013.01); F16B 15/02 (2013.01); F16B 15/06 (2013.01)

(58) Field of Classification Search
CPC .... F16B 5/0258; F16B 5/0088; F16B 5/0096; F16B 21/20; F16B 15/06; F16B 15/02
USPC ......................................................... 411/388
See application file for complete search history.

(56) References Cited

U.S. PATENT DOCUMENTS

| 2,528,675 A * | 11/1950 | Tinnerman ............... G05G 1/12 403/343 |
| 2,553,917 A | 5/1951 | Hartman |
| 2,560,961 A | 7/1951 | Knohl |
| 3,148,579 A | 9/1964 | Giovanetti |
| 3,871,430 A * | 3/1975 | Meyer ..................... F16B 5/126 24/323 |
| 3,961,855 A * | 6/1976 | Basile ................... F16D 1/0835 403/329 |
| 3,966,339 A | 6/1976 | Nemecek et al. |
| 4,454,699 A * | 6/1984 | Strobl ................... F16B 21/082 403/298 |

(Continued)

FOREIGN PATENT DOCUMENTS

GB      635670      2/1948

OTHER PUBLICATIONS

Pirog, Pawel, European Search Report for EP16171787, dated Oct. 11, 2016, 6 pages, European Patent Office, Munich, Germany.

*Primary Examiner* — Gary W Estremsky
(74) *Attorney, Agent, or Firm* — Henricks Slavin LLP

(57) ABSTRACT

A grommet (200, 300, 400), a stud (102), an assembly of a grommet and a stud forming a fastener (100), and a method of assembling a grommet and a stud to form a fastener has the grommet with an interengaging element (250) in a channel wall of the grommet for engaging a cooperating, compatible or complementary interengaging element in a wall of the stud. The grommet and the stud can be assembled by moving the grommet and the stud relative to each other until the interengaging element in the grommet engages the complementary interengaging element in the stud. A family of grommets is described.

18 Claims, 4 Drawing Sheets

(56) References Cited

U.S. PATENT DOCUMENTS

| | | | |
|---|---|---|---|
| D293,880 S | 1/1988 | Takahashi | |
| 4,805,366 A | 2/1989 | Long | |
| 4,963,051 A | 10/1990 | Hutter | |
| 5,306,098 A * | 4/1994 | Lewis | F16B 19/004 |
| | | | 411/510 |
| 5,442,141 A * | 8/1995 | Gretz | H02G 3/081 |
| | | | 174/152 G |
| 5,518,215 A | 5/1996 | Lyons | |
| 5,545,854 A * | 8/1996 | Ishida | H02G 3/081 |
| | | | 16/2.2 |
| 5,685,682 A | 11/1997 | Gilme et al. | |
| 5,806,140 A * | 9/1998 | Carlson | G02B 6/4452 |
| | | | 16/2.1 |
| 6,176,662 B1 | 1/2001 | Champney et al. | |
| 6,276,644 B1 | 8/2001 | Jennings | |
| 6,394,464 B1 * | 5/2002 | Moreau | H02G 3/0675 |
| | | | 174/652 |
| 6,442,806 B1 | 9/2002 | Wesson | |
| 6,538,201 B1 * | 3/2003 | Gretz | H02G 3/0691 |
| | | | 16/2.1 |
| 7,264,431 B2 | 9/2007 | Trueb et al. | |
| 7,658,583 B2 | 2/2010 | Homner | |
| 7,950,889 B2 * | 5/2011 | Homner | F16B 5/0642 |
| | | | 411/510 |
| 8,511,962 B2 | 8/2013 | Schuech et al. | |
| 8,931,993 B2 | 1/2015 | Komsitsky et al. | |
| 9,683,591 B2 | 6/2017 | Lo et al. | |
| 9,944,239 B1 * | 4/2018 | Diep | H02G 3/083 |
| 9,989,081 B2 * | 6/2018 | Slepecki | F16B 13/12 |
| 2016/0348708 A1 | 12/2016 | Lo et al. | |
| 2017/0321736 A1 | 11/2017 | Seiler et al. | |

* cited by examiner

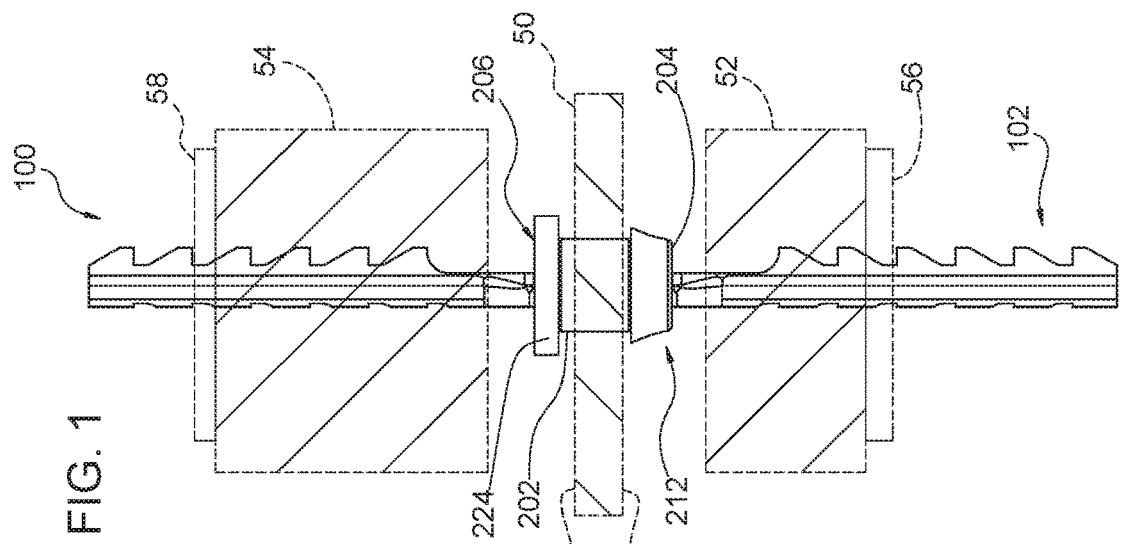
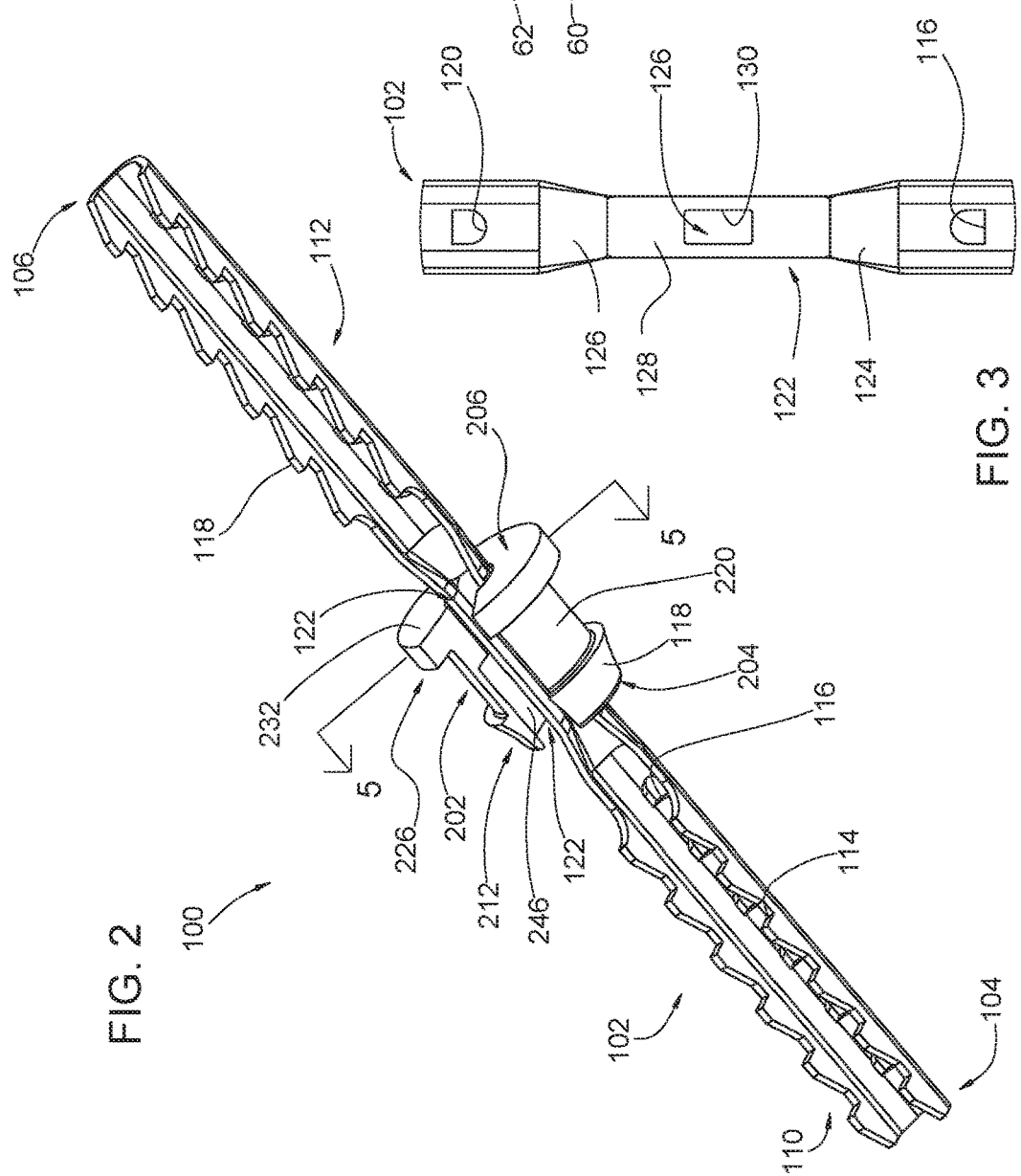

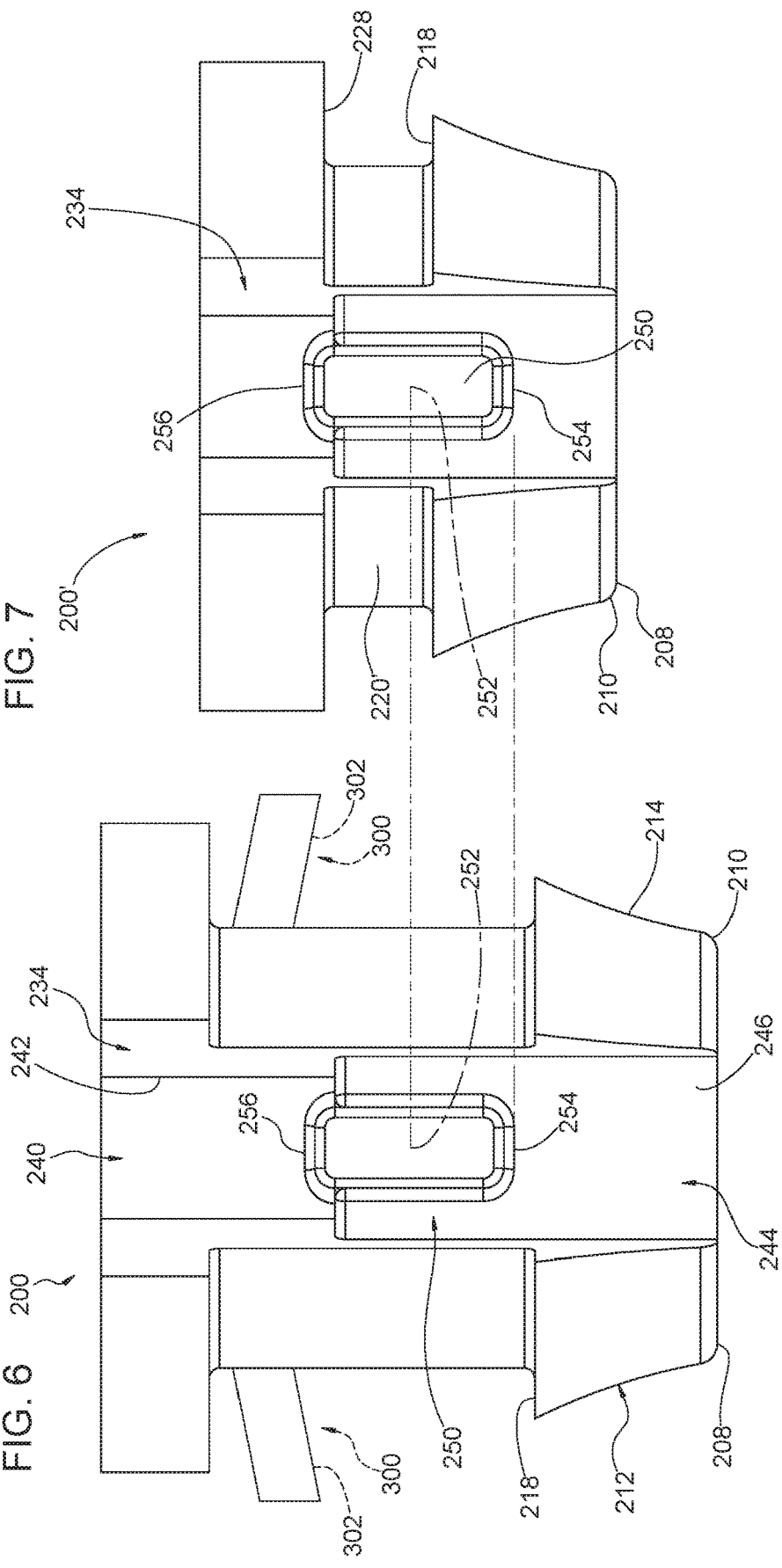
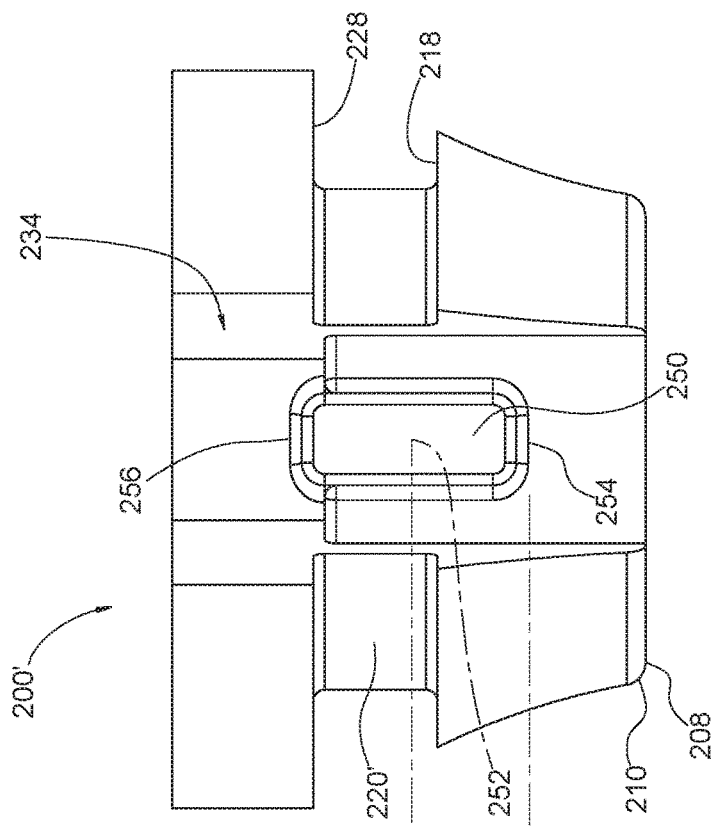

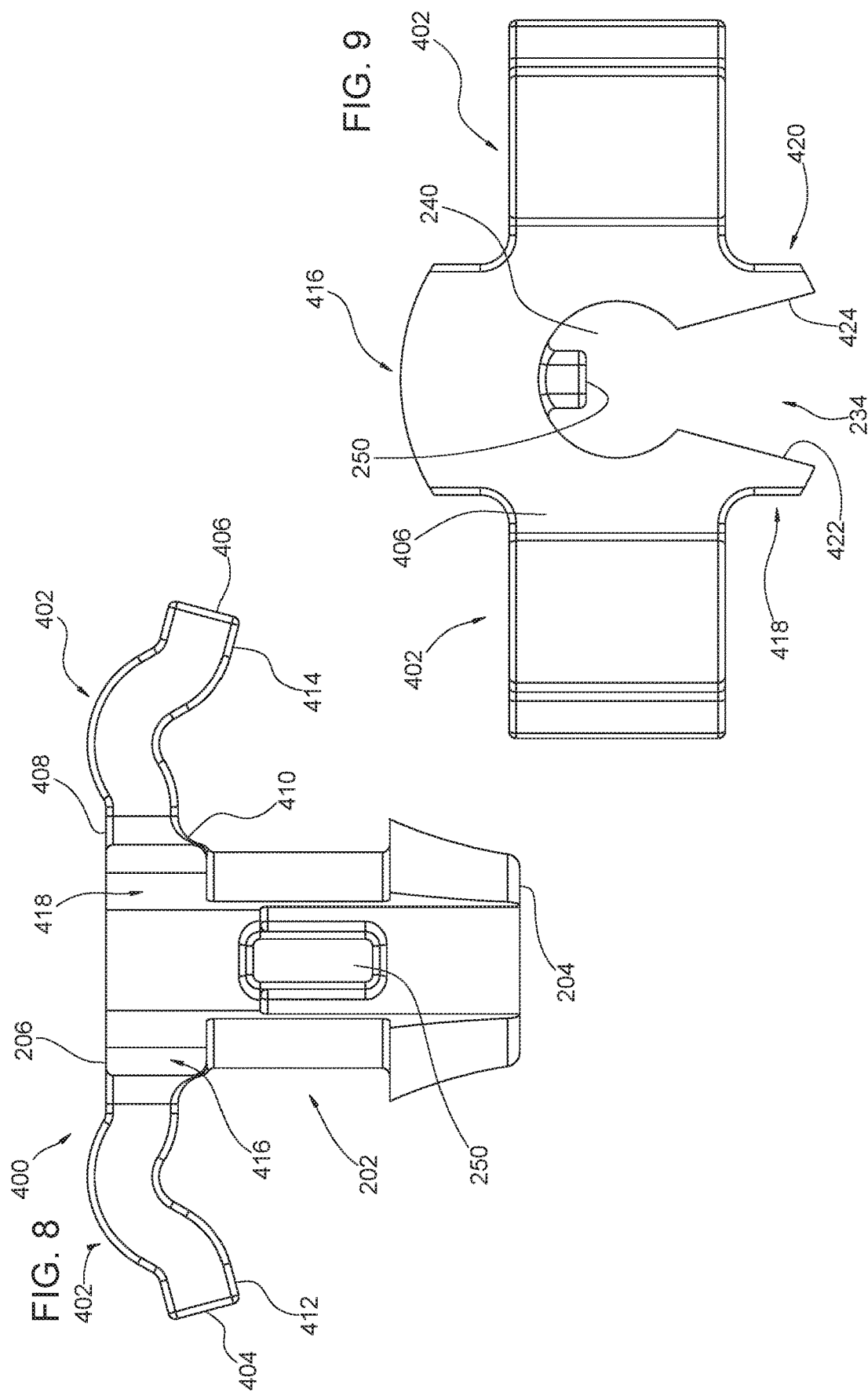

US 11,215,214 B2

FASTENERS, FASTENER ASSEMBLIES AND COMPONENTS THEREOF

BACKGROUND

These inventions relate to fasteners and studs and grommets therefor, including components for fasteners having internal complementary interengaging elements, for example, studs and/or grommets having internal complementary interengaging elements, for example a recess, cavity or opening for receiving an internal projection, protrusion or boss. Such assemblies and components can be used on aircraft.

RELATED ART

U.S. Pat. No. 8,931,993 teaches lining fasteners and methods and apparatus therefor, for example for insulation blankets such as those used on aircraft, One configuration includes a fastener stud having first and second post elements having respective first and second side walls connected by respective bridge portions and respective pluralities of retaining surfaces. A support interface between the first and second post elements has a bridge element and wings forming a partial or complete circle for the support interface. A grommet is supported on the support interface, and is held in position axially by respective ones of adjacent retaining surfaces on the post elements, contacting longitudinal end surfaces on the grommet. External rings on the grommet help to engage an interior surface of an opening in a structure into which the grommet is to be inserted.

The wings are separated at respective end surfaces from adjacent retaining surfaces by cuts or gaps. Material adjacent the cuts or gaps may experience higher load concentrations than desired. The rings on the grommet in some configurations may contribute to migration of the grommet within the opening of the structure, and in some configurations of the grommet and stud, they may shift or move relative to each other.

SUMMARY

A grommet, a stud and an assembly of a grommet and a stud in a fastener assembly can be used to provide a better faster assembly, including to withstand expected loading, reliably position a grommet and stud with respect to each other, and/or reliably position the assembly in an opening.

In one example of a grommet, including for a fastener assembly, the grommet includes a body having first and second ends, for example at respective end portions of the body, with a channel extending through the body between the first and second ends defined by a channel wall. The channel wall extends at least partly around a longitudinal axis of the body.

The channel wall includes an interengaging element, or may include a plurality of interengaging elements, positioned between the first and second ends and configured to engage a compatible interengaging element in a stud wall, which may but need not be complementary, when the stud wall extends along the channel.

According to other advantageous aspects of the inventions; the grommet can include one or more of the following features, taken individually or according to any or all of the possible technical combinations:

the interengaging element or any of them is compressible and/or elastically deformable;

an interengaging element extends inwardly toward the interior of the channel;

an interengaging element has a rectangular geometry;

a first surface at an end portion of the body faces away from the first end on a partly conical structure;

an at least partly radially-extending element positioned adjacent the second end;

an at least partly radially-extending element positioned adjacent the second end extends at least partly around a perimeter of the grommet;

an at least partly radially-extending element extends substantially radially outward from the grommet;

an at least partly radially-extending element extends around at least half the perimeter of the grommet;

a plurality of at least partly radially-extending elements;

one or a plurality of tabs extend outward from the grommet and are positioned axially between a first surface adjacent the first end and a second surface adjacent the second end;

a stud having first and second ends and an intermediate portion forming a receiving portion supporting the body of the grommet and an interengaging element on the stud complementary to the interengaging element on the grommet; and a stud supporting the grommet and having a complementary interengaging element wherein the complementary interengaging element is a recess or is an aperture or hole extending through a wall of the stud, with the interengaging element in the grommet extending into the recess or aperture or hole.

The inventions also relate to an assembly of a grommet and a stud, for example for a fastener assembly, wherein the stud includes first and second post portions, for example post portions that may include respective retaining elements, and further includes an intermediate grommet supporting portion between the first and second post portions. The intermediate grommet supporting portion includes a stud inter-engagement element, and the grommet includes an internal channel wall having the grommet inter-engagement element, and wherein the stud inter-engagement element and the grommet inter-engagement element are complementary.

According to other advantageous aspects of the inventions, a grommet and stud assembly includes one or more of the following features; taken individually or according to any one or more of the possible technical combinations:

the grommet inter-engagement element is flexible and/or resilient;

the grommet inter-engagement element is substantially centered between opposite ends of the grommet, longitudinally and/or arcuately or angularly;

the stud inter-engagement element is a rectangular opening through a wall of the stud intermediate grommet supporting portion; and the stud inter-engagement element is approximately centered about a perimeter of the grommet supporting portion.

The inventions also relate to an assembly of a stud having first and second post portions on opposite sides of a receiving portion and a family of grommets, any one of which can be used on the stud, and wherein at least first and second grommets in the family of grommets have different axial lengths, but where the first and second grommets have respective inter-engagement elements substantially centered axially on an internal channel wall of the grommet.

The inventions also relate to a method of assembling a stud and a grommet, for example a stud and grommet for a fastener assembly, including positioning the grommet partly around a receiving portion of the stud and adjusting the axial and angular position of the grommet on the receiving portion of the stud until an inter-engagement element on an interior wall of a channel in the grommet engages a compatible, or complementary, inter-engagement element on the stud. In one example, the inter-engagement element on the stud is an opening through a wall in the stud, and in another example, the complementary inter-engagement elements on the grommet and on the stud are rectangular, and in a further example, the grommet inter-engagement element is resiliently flexible.

These and other examples are set forth more fully below in conjunction with drawings, a brief description of which follows.

BRIEF DESCRIPTION OF THE DRAWINGS

FIG. 1 is a side elevation view of a stud and grommet assembly and illustrating schematically an application of the assembly supported in a structure and supporting a plurality of panels, for example insulation panels.

FIG. 2 is an upper isometric view of a stud and grommet assembly, for example for a fastener assembly as illustrated in FIG. 1, and illustrating a first exemplary assembly FIG. 3 is a detailed elevation view of a portion of the stud illustrated in FIGS. 1-2.

FIG. 6 is a front elevation view of another example of a grommet that can be used as part of a stud and grommet assembly such as that illustrated in FIG. 2.

FIG. 7 is a front elevation view of a further example of grommet that can be used as part of a stud and grommet assembly such as that illustrated in FIG. 2.

FIG. 8 is a front elevation view of an additional example of a grommet that can be used as part of a stud and grommet assembly such as that illustrated in FIG. 2.

FIG. 9 is a top plan view of the grommet of FIG. 8.

DETAILED DESCRIPTION

Figure 4:
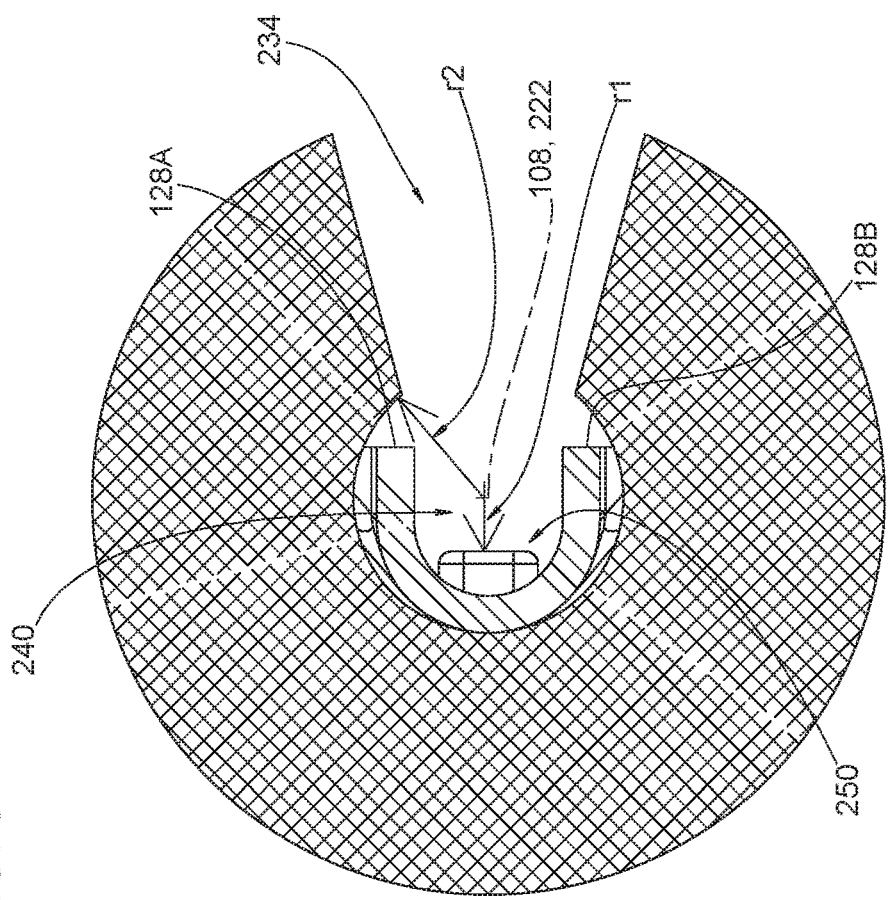
FIG. 4 is a detail view of a vertical longitudinal cross-section of the stud and grommet assembly illustrated in FIGS. 1-2 and illustrating compatible and complementary interengaging elements on the grommet and the stud.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of fasteners and grommets and/or studs therefor and of methods of making and using the fasteners and grommets and/or studs therefor are described. Depending on what feature or features are incorporated in a given structure or a given method, benefits can be achieved in the structure or the method. For example, fasteners and grommets therefor using interior inter-engagement elements provide for reliable positioning of the grommet and stud relative to each other and allows the stud to withstand expected loading, for example by reducing or eliminating cuts in edge surfaces of the stud. In another example, fasteners and grommets therefor having internal inter-engagement elements allows a given stud to accommodate any one of several grommets in a family of grommets, for example where different sized grommets are used with different sizes of structures with identical studs. In a further example, fasteners and grommets therefor wherein the grommet has at least one non-planar tab allows stable and reliable positioning of the assembly in a structure.

In some configurations of fasteners and grommets and/or studs therefor, improvements can be achieved also in assembly. For example, an internal inter-engagement configuration for a grommet can help to reliably position the grommet on a complementary configured stud both axially and angularly.

These and other benefits will become more apparent with consideration of the description of the examples herein. However, it should be understood that not all of the benefits or features discussed with respect to a particular example must be incorporated into a fastener and/or grommets therefor or method in order to achieve one or more benefits contemplated by these examples. Additionally, it should be understood that features of the examples can be incorporated into a fastener and/or grommets therefor or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of fastener configurations and/or grommets therefor and of methods of making and using the fasteners and grommets therefor are described herein. However, it will be understood that a given component or method could be combined with other structures or methods not expressly discussed herein while still achieving desirable results.

As used herein, "substantially" shall mean the designated parameter or configuration, plus or minus 10%. However, it should be understood that terminology used for orientation or relative position, such as front, rear, side, left and right, upper and lower, and the like, may be used in the Detailed Description for ease of understanding and reference, and may not be used as exclusive terms for the structures being described and illustrated.

In the present examples, a fastener assembly 100 (FIGS. 1-5) can be used on a structure 50 (FIG. 1) for supporting or securing one or more substructures, for example insulation blankets or panels 52 and 54 with respective retaining discs 56 and 58. A common structure may be an aircraft structure, but may also be other suitable structures.

In the present examples, the fastener assembly 100 (FIGS. 1-5) includes a stud 102 extending longitudinally from a first end 104 to a second end 106 along a center axis 108 (FIGS. 4-5), and can have a length to provide a post portion, for example either post portion 110 or 112. In the illustrated configuration, the stud 102 includes two post portions, first and second post portions 110 and 112 having the desired number of retaining elements 114 and 116 on the first post portion, and 118 and 120 on the second post portion, which can retain discs 56 or 58, as appropriate, With a single post portion, for example, the first post portion extends longitudinally from the first end 104 to a receiving portion at an opposite end portion (not shown) for receiving a grommet, for example any of the grommet configurations described herein. The receiving portion can take a number of configurations, for example those suitable for receiving and supporting such grommets, and may have a geometry or profile the same as or comparable to the adjacent post portion, or the same as or comparable to the profile or geometry of the receiving portion described more fully below. In the illustrated example, the stud 102 includes first and second post portions that extend longitudinally on opposite sides of a receiving portion, for example in the illustrated configuration a receiving portion 122 on an intermediate portion between the first and second post portions, and each of the first and second post portions and receiving portion extend longitudinally along the central axis 108.

The receiving portion 122 can take a number of configurations, suitable for receiving grommets for use in a fastener assembly for structures, as would be understood by one of ordinary skill in the art in view of the descriptions herein. In one configuration of the receiving portion, the receiving portion can have the same or similar geometry and profile as an adjacent post portion, for example with or without retaining elements 114, 116, 118 and 120. Alternatively, and as shown in the illustrated configurations, the receiving portion 122 includes respective reduction sections 124 joining the first post portion to the receiving portion and 126 joining the second post portion 112 to the receiving portion. The reduction sections transition the shape of the stud at the respective first and second post portions to the shape of the stud at the receiving portion. In the illustrated example, the first and second post portions can have cross-sectional profiles and retaining elements identical or similar to those illustrated and described in U.S. Pat. No. 8,931,993, the content of which is incorporated herein by reference. In one example, the first and second post portions have U-shaped cross-sectional profiles, having a semicircular cross-section for the retaining elements 116 and 120, and straight sidewalls for the retaining elements 114 and 118. However, the first and second post portions can take other configurations, including V-shaped, or as illustrated in FIGS. 1-5, the cross-sectional profile of the first and second post portions are V-shaped with a partially circular bottom and walls diverging outwardly to straight and parallel walls supporting the respective retaining elements 114 and 118. Alternatively or additionally, other configurations can be incorporated into the stud.

In the present example, the receiving portion 122 has a substantially U-shaped cross-sectional profile (FIGS. 1-5). Therefore, in the illustrated configuration, the reduction sections are formed so as to transition from the respective post portion to the receiving portion 122. As illustrated, the reduction sections are mirror images of each other, but can be different from each other, for example for different post portions.

The receiving portion 122 extends longitudinally sufficient to accommodate the desired grommet, examples of which are described more fully below. The cross-sectional profile of the receiving portion is substantially U-shaped with straight parallel sidewalls and a semicircular junction between the two sidewalls. The U-shaped profile helps to more easily assemble a grommet on the receiving portion.

Figure 5:
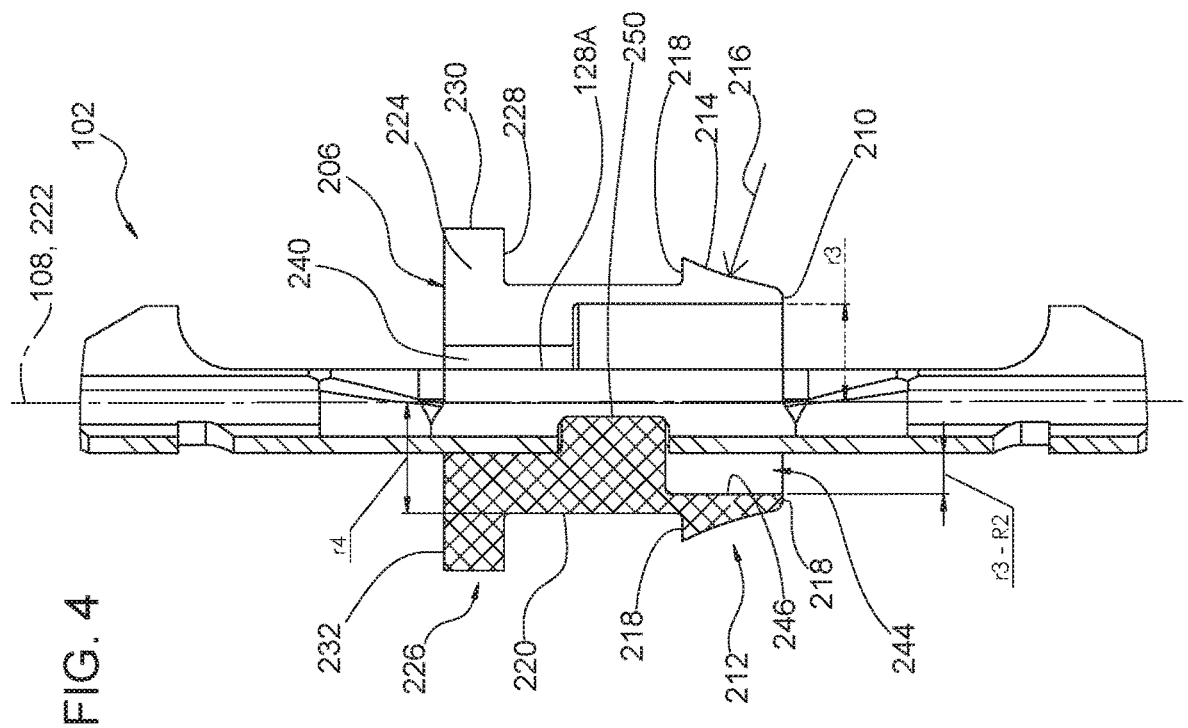
FIG. 5 is an enlarged transverse cross-sectional view of the assembly of FIG. 5 taken along line 5-5.

The receiving portion 122 includes an inter-engagement portion 126. The inter-engagement portion may be a recess or cavity formed in the external wall 128 of the receiving portion. In one configuration, the recess or cavity may be an aperture or hole formed through the wall of the receiving portion, for example formed by an opening 130 through the thickness of the wall 128. In the example illustrated, the opening 130 is a rectangular opening, but may have other profiles. Also in the illustrated example, the opening 130 is substantially centered longitudinally of the receiving portion, but may be formed at other axial positions along the receiving portion. Substantially centering the opening 130 axially accommodates a number of different lengths of grommets having cooperating, compatible or complementary interengaging elements, for example complementary to the opening 130. As used herein, "complimentary" includes at least partly complimentary to the extent that an interengaging element on a grommet will extend into an opening in a receiving portion, and fully complimentary would have a cross section of the interengaging element at the area interior to the walls of the opening 130 having the same geometry as the opening 130, for example oval and oval, or square and square, or rectangular and rectangular or polygons of the same geometry. Also in the illustrated example, the opening 130 is substantially centered angularly on the perimeter of the receiving portion 122, between the end surfaces 128A and 128B in the wall 128 (FIGS. 4-5). Positioning the opening angularly centered helps in the assembly of a grommet having a complementary interengaging element onto the receiving portion. Alternative to the illustrated configuration, a recess, cavity, aperture or hole may be positioned at other locations on the receiving portion, and have other profiles than rectangular.

Several grommet configurations and families of grommets are described herein, any one of which can be used with the stud 102. FIGS. 1-5 illustrate a first grommet configuration, but it is understood that any of the grommet configurations described herein can be used with the stud 102. Any such stud and grommet assemblies can form respective fastener assemblies, any one of which can be used on structures such as illustrated in FIG. 1.

In one example of a grommet for use with a stud to form a fastener assembly or other combinations, a grommet 200 (FIGS. 1-2 and 4-5) includes a body 202. The body extends axially between first and second ends 204 and 206, respectively. The first and second ends can lie in respective planes (not shown), which in the present example are parallel, or may have other configurations. In each of the illustrated configurations, the first end includes a flat planar surface 208 (FIGS. 6-7) extending radially outwardly to a curved or radiused transition 210. The curved transition 210 helps for easy insertion into an opening in a structure, for example structure 50 (FIG. 1).

The outside surface of the body diverges away from the curved or radiused transition 210 to a generally frustoconical end portion 212. The frustoconical end portion helps to guide the assembly with the grommet into an opening in a structure, for example structure 50 (FIG. 1). In the illustrated configuration, the frustoconical end portion 212 includes a radiused diverging surface 214 having a radius of curvature 216 (FIG. 4). The radiused diverging surface 214 helps to ease insertion of the grommet into an opening in the structure, for example by reducing the initial counterforce or back load that might occur during insertion.

The frustoconical end portion 212 extends to a transverse or flange surface 218. The transverse surface is adjacent the first end and is configured to contact a first surface 60 on the structure 50 (FIG. 1), to help in positioning the fastener assembly, and therefor the insulation blanket or blankets, on the structure.

The outside surface of the body includes an at least partially cylindrical intermediate body portion 220 extending axially from the flange surface 218 toward the second end 206. The intermediate body portion 220 has an outside surface extending substantially parallel to a central axis 222 (FIG. 5) of the grommet. In a common configuration, the outside surface geometry will be configured to conform to the inside surface geometry of the opening in the structure 50 into which the fastener assembly is inserted.

The intermediate body portion 220 extends to a flange or rim 224 at a second end portion 226 of the grommet body. The flange 224 extends outwardly of the body and away from the central axis 222. The flange 224 provides a support and stop surface, and includes a facing surface 228, facing the transverse or flange surface 218. The facing surface 228 is configured to contact a second surface 62 on the structure 50 (FIG. 1), to help in positioning the fastener assembly, and therefor the insulation blanket or blankets, on the structure. In the illustrated configuration of the grommet 200, the flange 224 is substantially planar, and includes a partially circular perimeter surface 230 and terminates axially at a substantially flat surface 232 extending in a plane substantially perpendicular to the central axis 222. The flange 224 is substantially continuous about the perimeter 230, except as described below. The second end portion may take a number of configurations, including others as described herein.

The grommet includes a longitudinally-extending opening or slot 234 (FIG. 5), extending the length of the grommet between the first and second ends. The opening 234 allows the grommet to flex resiliently to be placed over the receiving portion of the stud 102. The opening also allows the grommet to be placed on the intermediate body portion 220 laterally and positioned in the desired orientation. The opening is an angular wedge of material missing from what would otherwise be a 360° revolution for the part, but where the sidewalls of the opening are taken off a radius of the part rather than on a radius, though on a radius is also possible. The sidewalls of the opening diverge outwardly at each axial position along the grommet. The grommet can be formed from nylon or similar material, for example nylon 6/6, and with such materials the grommet can be resiliently flexible for being placed over the receiving portion of the stud, positioning the grommet on the stud so that complementary interengaging portions fit together, and so that the assembly can be placed in and supported by a suitable opening in a structure.

The interior of the grommet includes a channel 240 defined by a channel wall. The channel wall is defined at the second end portion by a substantially cylindrical wall 242, extending axially through the interior the grommet, centered substantially around the central axis 222. The cylindrical wall is substantially circular except for the opening 234 and is formed with a radius r2 larger than the radius of the semicircular section 128 of the stud receiving portion 122, and slightly larger than the largest radius on the receiving portion (see FIG. 5). The axial length of the channel 240 at the radius r2 can be selected as desired, and in the present example is selected based on the desired overall axial length of the grommet. The channel wall is defined at the first end by a second cylindrical wall 246 that is substantially circular except for the opening 234. The second cylindrical wall is formed with a radius r3 greater than the radius r2, such as forming a counterbore 244 with a reduced cross-section thickness compared to the cross-section thickness of the grommet second end. The reduced cross-section thickness of the first end allows compression of the frustoconical end portion 212 and a portion of the intermediate body 220 when the assembly is inserted into an opening, such as an opening in the structure 50. The opening 234 also allows compression of the frustoconical end portion.

The interior of the grommet in the channel also includes an interengaging element 250. The interengaging element 250 extends inward to the interior of the channel. The interengaging element is configured to engage an interengaging element on a stud, for example the stud 102. The interengaging element in one configuration has a geometry complementary to the geometry of the stud 102, for example the interengaging element 126. In the illustrated example, the complementary geometries are a rectangular boss extending radially inward from the channel wall and a rectangular opening 130 in the stud. The geometries can be other than complementary, for example cooperating or compatible, and still allow inter-engagement between the interengaging element 250 in the interior of the grommet and the interengaging element 126 in the stud, and still have limited relative axial movement between the grommet and the stud, and limited relative angular movement between the grommet and the stud.

The interengaging element 250 extends radially inward, and forms a boss, projection, or raised element, and forms a retention tab for helping to retain the grommet on the stud by interengaging the grommet and the stud. The interengaging element 250 is centered axially in the grommet, which helps to more predictably position the grommet on the stud, for example where the grommet is selected from a family of grommets of different axial lengths. In an example where the grommet is selected from a family of grommets of different axial lengths, and where the interengaging element 250 is substantially centered axially, the user can know that any selected grommet can be centered at the same position on the stud. A more limited family of grommets can have the interengaging element 250 positioned at another axial location and reliably predict the positioning on the stud, but the maximum lengths of the grommets in the more limited family of grommets is reduced for a given length of receiving portion on the stud.

The interengaging element 250 is also centered angularly or arcuately in the interior of the grommet. If the complementary interengaging element 126 in the stud is also centered angularly or arcuately in the receiving portion 122, positioning of the grommet on the stud may be easier by alignment of the opening 234 with the opening in the stud between the free side edges. The interengaging element 250 can also be positioned at other locations angularly or arcuately on the interior of the grommet, for example adjacent the opening 234, which may increase visibility of the interengaging element 250 while the grommet is being positioned on the stud.

In the illustrated example, the interengaging element 250 extends inwardly toward the body axis 222, and terminates at a substantially flat surface a distance r1 from the axis 222 (FIG. 5). The height of the interengaging element 250 from the cylindrical wall 242 is approximately twice the wall thickness of the receiving portion of the stud 102 (FIG. 4). Therefore, when the grommet is positioned on the receiving portion other than with the interengaging element 250 in the stud interengaging element 126, the grommet will be enlarged, with the opening 234 expanded. Once the interengaging element 250 extends through the opening 130, the grommet returns to the shape illustrated in FIG. 5, with the opening 234 reduced.

Having the interengaging element 250 internal to the channel in the grommet allows reliable axial positioning of the grommet on the stud, even for a different axial length of the grommet. The grommet 200 (FIG. 4) has an intermediate body portion 220 having an axial length to accommodate a selected thickness of panel, or different thicknesses of panels, for example up to a maximum thickness slightly less than the axial length of the intermediate body portion 220.

The grommet 200 can be a member of a family of grommets, wherein any member of the family of grommets can be used on an identical stud, for example stud 102. The members of the family of grommets can vary one from another in the overall axial length of the grommet. In one example, all of the grommets in the family can have the interengaging element 250 substantially centered axially and/or substantially centered angularly or arcuately in the interior of the grommet. If the interengaging element 250 is substantially centered axially, the first and second ends of a given grommet will be the same distance from the axial center of the grommet, and may also be substantially the same distance from the interengaging element 126 in the stud. Where the interengaging element 250 and the interengagement element 126 are substantially centered in their respective structures, the first and second ends of a given grommet will be the same distance as the other from their respective ends of the intermediate body portion 122, Likewise, the fastener assembly with an identical stud and a grommet from such family of grommets will be positioned in its respective structure 50 at the same axial position.

The grommet 200 and a functionally similar grommet 200' (FIGS. 6-7) can be included in the same family of grommets as they are similar in structure but for the axial length of the intermediate body portion 220. The elements described with respect to the grommet 200 are identical and are numbered identically in the grommet 200', but the axial length of the intermediate body portion 220' is shorter in the grommet 200', and other grommets in the family can vary from the others by the axial length of the intermediate body portion while otherwise being identical or substantially the same as the other grommets in the same family. In the present example, the first end 208 is made closer to the interengaging portion 250 by changing the axial distance from the center point 252 to the transverse surface 218, and the second end 206 is made closer to the interengaging portion 250 by changing the axial distance from the center point 252 to the facing surface 228. The geometry and dimensions in the present example of the family of grommets of the interengaging portions 250 are substantially the same, but one or more of them may be made different depending on how the user defines the contents of the family to be used with identical or substantially the same studs. In the illustrated example, the interengaging portions 250 on the grommet 200 and grommet 200' are configured to have the same distance from the center 252 of the interengaging portion to the distal end surfaces 254, and likewise from the center to the proximal end surfaces 256. Members of the family can also be different in the outside diameter of the intermediate body portion (220, 220', 2 times r4), and/or in the inside diameter (2 times r3) (FIG. 4), Different outside diameters of the intermediate body portion can accommodate different sizes of structure openings. Different inside diameters of the frustoconical portion 212 can increase or decrease the spacing between the grommet and the adjacent outside surface of the stud (r3–R2). Increasing or decreasing the spacing between the grommet and the stud provides flexibility in the process of installation between the stud and one grommet in the family and the stud in another grommet in the family.

A family of grommets for identical studs allows combinations of a stud and a grommet from the same family to be used on a structure having a given thickness, and a stud and a different grommet from the same family to be used on another structure having a different thickness. The family of grommets reduces the number of stud configurations required for the grommets and corresponding structures, and provides consistency in assembling the insulation fastener and in installation of the insulation fastener assembly.

Any of the grommets described herein can be modified to include one or a plurality of tabs 300 (FIG. 6). In this example, the grommet 200 (or any or all of the grommets in a family of grommets) can be modified to include one or a plurality of tabs 300. Each of a plurality of tabs would be identical, and therefor only one tab 300 is described herein. A plurality of tabs can be distributed spaced equally around a perimeter of the grommet, or they can be spaced apart from each other at uneven spacings. In the present example of a modified grommet 200 illustrated for convenience only by modifying FIG. 6, tab 300 is formed of the same material as the rest of the grommet and extending from a perimeter surface of the intermediate body portion 220 closely adjacent the facing surface 228. The tabs 300 can extend radially outward from the perimeter surface 220, for example in a plane perpendicular to the central axis 222 of the grommet, or can extend at an angle to the perimeter surface extending away from the facing surface 228, as illustrated. The angular or arcuate width of the tab can be selected as desired, for example for stiffness or bias to be applied to an adjacent surface of a structure.

Other grommet configurations can be used with a stud, for example the stud 102, in a fastener assembly, either as an individual grommet configuration, or as a grommet in a family of grommets. In another example of a grommet configuration (FIGS. 8-9), where elements identical or substantially similar to the grommet 200 described with respect to FIGS. 1-7 are numbered identically, and have the same or similar structures and functions, a grommet 400 includes an at least partly radially extending element 402, and in the present example a plurality of wave-like elements 402, extending at least partly radially and positioned around a perimeter of the grommet adjacent the second end 206. In the present example, the plurality of at least partly radially extending elements 402 are identical and only one will be described in detail. The elements 402 are positioned on the grommet on substantially diametrically opposite sides of the grommet at the second end 206. The elements 402 have the same structure and geometry from a point adjacent the body 202 to respective terminal end surfaces 404 and 406.

The element 402 includes a relatively flat upper surface 408 coplanar with the second end 206 at the point where that portion of the element 402 joins the grommet body. The opposite, lower surface 410 extends from the grommet body radially outward and upward away from the first end to form a structure having a concave surface extending in a direction of a line contained in a plane transverse to the central axis 222 of the grommet. The cross-sectional area of the element 402 reduces over the extent of the concave lower surface 410.

The element 402 then extends outward and upward relative to a transverse plane (not shown) centered on the interengaging element 250, and then outward and downward toward the transverse plane centered on the interengaging element to form a wing concave from the point of view of the first end 204. The element 402 then turns more outward relative to the transverse plane centered on the interengaging element to terminate at the terminal end surface 404 or 406, which then forms a structure contact surface 412 or 414. The structure contact surface may bear against the adjacent surface of the structure 50 when the assembly is inserted into an opening in the structure, and/or during normal operating conditions when the fastener assembly and other components are assembled in the structure.

In the present example, the at least partly radially extending elements 402 include at least one concave surface, and in the present examples two concave surfaces, facing the first end 204. The elements 402 are nonplanar, and in the present example include at least one convex surface facing the first end 204. The elements 402 help to position the grommet, and therefore the fastener assembly, in an opening of a structure. The elements 402 allow a single grommet of a given geometry and size to be used on structures having different thicknesses. In such an example, a plurality of grommets of the type illustrated and described with respect to the grommet 400 having the same structure and function but different axial lengths can form a family of grommets to be used with identical studs. In such a family, a particular grommet may be selected from the family for a fastener assembly as a function of the structure thickness, and a particular grommet can be used on structures having a wider range of thicknesses than, for example, a single grommet size selected from the family corresponding to grommets 200 and 200', for example. The grommet 400 is formed also from nylon or similar material, such as nylon 6/6.

In the illustrated configuration, the grommet 400 (FIGS. 8-9) includes a tab 416 (FIG. 9), in the present example centered between the oppositely directed at least partly radially extending elements 402, on a side of the grommet opposite the opening 234. The tab extends substantially in a plane, and extends over a substantial arc between the two elements 402. Also in the present example, the axial length of the tab is approximately the same as the axial length of the entrance tabs, described more fully below. The tab helps to position the grommet and therefor the fastener assembly relative to the structure 50.

The grommet 400 also includes a pair of entrance tabs 418 and 420 on opposite sides of the opening 234. The entrance tabs have an axial length greater than the axial length of the elements 402 where the elements 402 join the grommet body. The opposite side surfaces 422 and 424 diverge outwardly away from the center axis 222 of the grommet from the channel 240.

The grommets 200, 200' and 400 are assembled onto a stud, for example stud 102, by moving the grommet laterally so that the opening 234 contacts the receiving portion 122 of the stud. The first end 204 of the grommet is positioned closest to the first post portion 110, and the cooperating and complementary interengaging elements 126 and 250 are approximately aligned. The grommet is advanced laterally, enlarging the opening 234 and flexing the sides of the grommet until the opening 234 passes the free end surfaces of the receiving portion 122. The grommet can be moved axially and/or rotationally until such time as the interengaging element 250 extends into the opening 130 in the stud. At that time, the interengaging element 250 on the interior of the grommet extends through the opening, and the sides of the grommet have closed further around the receiving portion of the stud. Thereafter, as determined by the user, the fastener assembly can be inserted into an opening in the structure 50, one or more insulation blankets or panels installed on respective post portions and secured by appropriate retaining elements.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. An assembly comprising a grommet wherein the grommet includes:
   a body extending axially between first and second ends and having a channel extending axially through the body between the first and second ends defined by a channel wall extending at least partly around a body axis;
   a first surface adjacent the first end configured to contact a first surface of a structure into which the grommet is to be inserted;
   a second surface adjacent the second end configured to contact a second surface of the structure into which the grommet is to be inserted; and
   an interengaging element in the channel wall, positioned axially between the first and second ends, and configured to engage a complementary interengaging element in a stud wall extending along the channel through the grommet when the grommet is inserted in a structure; and
   a stud, the stud having a post portion, having retaining elements, and a receiving portion adjacent the post portion configured to receive the body of the grommet with the channel wall extending at least partly around the receiving portion, and further including a complementary interengaging element in the receiving portion engaging the interengaging element in the channel wall wherein the complementary engaging element is selected from the group of a recess in a wall of the receiving portion and a hole formed through a wall of the receiving portion of the stud.

2. The grommet of claim 1 wherein the interengaging element in the channel wall is releasable from the complementary interengaging element in the stud wall.

3. The grommet of claim 1 wherein the interengaging element extends inwardly toward the body axis from the channel wall.

4. The grommet of claim 1 wherein the interengaging element has a rectangular geometry.

5. The grommet of claim 1 wherein the first surface faces away from the first end on a partly conical structure.

6. The grommet of claim 1 further including an at least partly radially-extending element adjacent the second end.

7. The grommet of claim 6 wherein the at least partly radially-extending element extends at least partly around a perimeter of the grommet.

8. The grommet of claim 6 wherein the at least partly radially-extending element extends substantially radially outward from the grommet.

9. The grommet of claim 6 wherein the at least partly radially-extending element is non-planar.

10. The grommet of claim 6 wherein the at least partly radially-extending element extends around at least half the perimeter of the grommet.

11. The grommet of claim 1 further including a plurality of at least partly radially-extending elements.

12. The grommet of claim 1 further including at least one tab extending outward from the grommet and positioned axially between the first and second surfaces.

13. The grommet of claim 1 further including longitudinally extending spaced apart walls defining a longitudinal slot extending between the first and second ends.

14. The assembly of claim 1 wherein the stud includes first and second post portions each having retaining elements, and wherein the receiving portion is positioned intermediate the first and second post portions.

15. A stud and a family of grommets according to claim 1 wherein a first group of grommets have a first length between the first and second ends and wherein a second group of grommets have a second length between the first and second ends different from the first length.

16. The stud and family of grommets according to claim 15 wherein the interengaging elements on at least two grommets in each of the first and second groups of grommets are substantially centered axially in the channel wall.

17. A method of assembling the grommet and stud of claim 1 comprising laterally moving the grommet and stud closer to each other to align the grommet with the receiving portion of the stud, placing the grommet on the receiving portion of the stud until the stud is in the channel of the grommet, and moving the grommet axially and/or angularly until the interengaging element on the interior of the grommet engages the interengaging element on the stud.

18. An assembly comprising a grommet wherein the grommet includes:
- a body extending axially between first and second ends and having a channel extending axially through the body between the first and second ends defined by a channel wall extending at least partly around a body axis;
- a first surface adjacent the first end configured to contact a first surface of a structure into which the grommet is to be inserted;
- a second surface adjacent the second end configured to contact a second surface of the structure into which the grommet is to be inserted; and
- an interengaging element in the channel wall, positioned axially between the first and second ends, and configured to engage a complementary interengaging element in a stud wall extending along the channel through the grommet when the grommet is inserted in a structure; and
- a stud, the stud having a post portion, having retaining elements, and a receiving portion adjacent the post portion configured to receive the body of the grommet with the channel wall extending at least partly around the receiving portion, and further including a complementary interengaging element in the receiving portion engaging the interengaging element in the channel wall wherein the receiving portion of the stud includes a first longitudinally extending edge and a second longitudinally extending edge and wherein the receiving portion extends around a perimeter from the first to the second longitudinally extending edges, and wherein the complementary engaging element is substantially centered axially of the receiving portion and substantially centered between the first and second longitudinally extending edges.

* * * * *